(12) United States Patent
Abe et al.

(10) Patent No.: US 10,795,376 B2
(45) Date of Patent: Oct. 6, 2020

(54) AUTOMATIC DRIVING CONTROL APPARATUS

(71) Applicant: SUBARU CORPORATION, Tokyo (JP)

(72) Inventors: Akiyuki Abe, Tokyo (JP); Masatoshi Hoshina, Tokyo (JP); Keisuke Kuwahara, Tokyo (JP); Yasuhiro Sekijima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 337 days.

(21) Appl. No.: 15/813,975

(22) Filed: Nov. 15, 2017

(65) Prior Publication Data

US 2018/0150084 A1 May 31, 2018

(30) Foreign Application Priority Data

Nov. 29, 2016 (JP) .................................. 2016-231349

(51) Int. Cl.
*G05D 1/02* (2020.01)
*G05D 1/00* (2006.01)

(52) U.S. Cl.
CPC ......... *G05D 1/0274* (2013.01); *G05D 1/0088* (2013.01); *G05D 1/0219* (2013.01); *G05D 1/0248* (2013.01); *G05D 1/0257* (2013.01)

(58) Field of Classification Search
None
See application file for complete search history.

(56) References Cited

U.S. PATENT DOCUMENTS

| 2017/0232967 A1* | 8/2017 | Tomatsu | ........... B60W 30/0956 |
| | | | 701/117 |
| 2017/0334451 A1* | 11/2017 | Asakura | ............ B60W 50/0098 |

(Continued)

FOREIGN PATENT DOCUMENTS

| JP | 2009-031205 A | 2/2009 |
| JP | 2014-119372 A | 6/2014 |

(Continued)

OTHER PUBLICATIONS

Japanese Notification of Reasons for Refusal issued in corresponding Japanese Patent Application No. 2016-231349, dated Jul. 10, 2018, with English Translation.

*Primary Examiner* — Tuan C To
*Assistant Examiner* — Kelly D Williams
(74) *Attorney, Agent, or Firm* — McDermott Will & Emery LLP

(57) ABSTRACT

An automatic driving control apparatus includes a controller. Upon execution of an automatic driving control of a vehicle, the controller determines, on the basis of a result of positioning and map information, presence or absence of a tollgate within a predetermined distance from the vehicle. The controller makes a transition to a tollgate passing mode, on a condition that the presence of the tollgate is determined within the predetermined distance and an increase in width of the road is further recognized on the basis of a result of recognition of an outside environment. In the tollgate passing mode, the controller sets a first target path on the basis of position information, of the tollgate, that is recognized on the basis of the result of the recognition of the outside environment. The first target path is a target path along which the vehicle is to pass through the tollgate.

10 Claims, 4 Drawing Sheets

(56) References Cited

U.S. PATENT DOCUMENTS

| | | | |
|---|---|---|---|
| 2018/0004211 A1* | 1/2018 | Grimm | G01C 21/3407 |
| 2018/0024562 A1* | 1/2018 | Bellaiche | G01S 19/48 |
| | | | 701/26 |
| 2018/0113460 A1* | 4/2018 | Koda | G05D 1/0088 |
| 2018/0174371 A1* | 6/2018 | Um | G07B 15/06 |

FOREIGN PATENT DOCUMENTS

| | | |
|---|---|---|
| JP | 2016-137819 A | 8/2016 |
| JP | 2016-153738 A | 8/2016 |

\* cited by examiner

AUTOMATIC DRIVING CONTROL APPARATUS

CROSS-REFERENCE TO RELATED APPLICATIONS

The present application claims priority from Japanese Patent Application No. 2016-231349 filed on Nov. 29, 2016, the entire contents of which are hereby incorporated by reference.

BACKGROUND

The technology relates to an automatic driving control apparatus, for a vehicle, that is provided with an outside environment recognizer.

Japanese Unexamined Patent Application Publication (JP-A) No. 2016-137819 discloses an automatic driving control apparatus for a vehicle that travels on a road. Specifically, JP-A No. 2016-137819 discloses the automatic driving control apparatus that, after allowing for traveling on an expressway by an automatic driving control, deactivates an automatic driving state and performs switching from the automatic driving state to a manual driving state at a point where exiting from an interchange is performed.

SUMMARY

For an automatic driving control apparatus for a vehicle such as that described above, it is desired to achieve effective automatic driving.

It is desirable to provide an automatic driving control apparatus that is able to allow for effective automatic driving.

An aspect of the present invention provides an automatic driving control apparatus including: an outside environment recognizer configured to recognize an outside environment of a vehicle; a traveling information detector configured to detect traveling information of the vehicle; a positioning device configured to perform positioning of the vehicle; a map information output device that stores map information including information on a road shape; and a controller configured to execute an automatic driving control of the vehicle on the basis of one or more of a result of the recognition of the outside environment, the traveling information, a result of the positioning, and the map information. Upon the execution of the automatic driving control, the controller determines, on the basis of the result of the positioning and the map information, presence or absence of a tollgate within a predetermined distance, from the vehicle, on a road on which the vehicle travels. The controller makes a transition in an operation mode of the vehicle from a regular traveling mode to a tollgate passing mode, on one of a condition that the presence of the tollgate is determined within the predetermined distance from the vehicle and an increase in width of the road is recognized on the basis of the result of the recognition of the outside environment, and a condition that the presence of the tollgate is determined within the predetermined distance from the vehicle and the width of the road becomes unrecognizable on the basis of the result of the recognition of the outside environment. When the operation mode of the vehicle is set to the tollgate passing mode, the controller sets a first target path on the basis of one or both of first position information of the tollgate and second position information of the tollgate, and controls each of a traveling speed of the vehicle and a steering angle of the vehicle to thereby cause the vehicle to travel along the first target path. The first target path is a target path along which the vehicle is to pass through the tollgate. The first position information is recognized on the basis of the result of the recognition of the outside environment. The second position information is determined on the basis of the map information.

DETAILED DESCRIPTION

Figure 1:
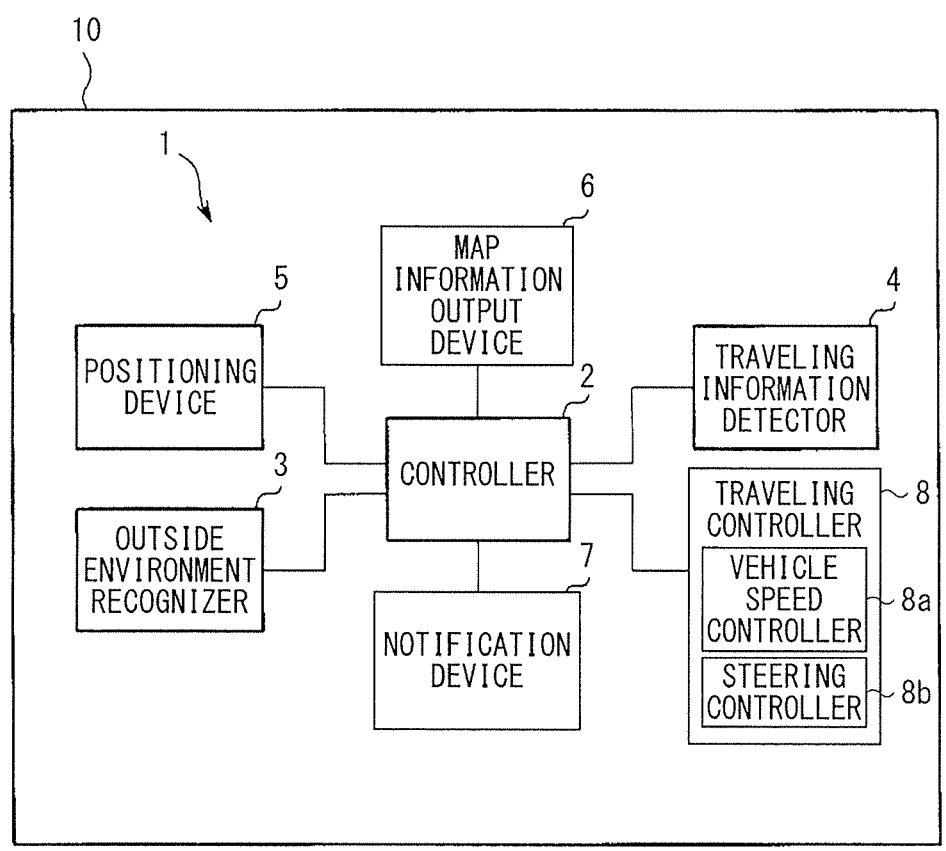
FIG. 1 is a block diagram illustrating an example of a configuration of an automatic driving control apparatus according to one implementation of the technology.

Some implementations of the technology are described below with reference to the accompanying drawings. It is to be noted that components illustrated in the drawings referred to in the description below differ from each other in scale. Thus, the respective components are illustrated in respective sizes that are recognizable in the drawings. Therefore, the technology is not limited to the numbers of the respective components, shapes of the respective components, ratios in size between the components, and relative positional relationships between the components illustrated in the drawings.

An automatic driving control apparatus 1 according to one implementation of the technology controls automatic driving of a vehicle 10 that travels on a road.

The vehicle 10 may have a configuration that allows for variation in an output generated by a power generator, variation in braking force generated by a brake device, and variation in steering angle, and variation in any other factor, on the basis of a control signal supplied from the automatic driving control apparatus 1. Non-limiting examples of the power generator may include an engine and an electric motor. Further, the vehicle 10 may be provided with a manual operation input device to be operated by a user of the vehicle 10, e.g., a driver of the vehicle 10, upon manual driving. The manual operation input device may include, for example but not limited to, a steering wheel, an accelerator, a brake pedal, and a shift lever.

Referring to FIG. 1, the automatic driving control apparatus 1 according to the present implementation may include, for example but not limited to, a controller 2, an outside environment recognizer 3, a traveling information detector 4, a positioning device 5, a map information output device 6, a notification device 7, and a traveling controller 8.

The controller 2 may include, for example but not limited to, a computer provided with components such as a central processing unit (CPU), a read-only memory (ROM), a random-access memory (RAM), and an input-output unit that are coupled to a bus. The controller 2 may control an operation of the automatic driving control apparatus 1 on the basis of a predetermined program.

The outside environment recognizer 3 recognizes an outside environment of the vehicle 10. Specifically, the outside environment recognizer 3 may detect an environment including a shape of a road on which the vehicle 10 travels, and a positional relationship between the vehicle 10 and an object present around the vehicle 10. The outside environment recognizer 3 may include one or more of devices such as a camera, a millimeter-wave radar, and a lidar. In one example of the present implementation, the outside environment recognizer 3 may include a stereo camera that captures an image in a direction in which the vehicle 10 travels, and recognize the environment including the shape of the road and the object both ahead of the vehicle 10 on the basis of the image captured by the stereo camera.

The outside environment recognizer 3 may recognize the shape of the road ahead of the vehicle 10 by detecting a linear or a dashed-line mark provided on the road by means of image recognition, for example. The linear or dashed-line mark may be so provided on the road along a traveling lane as to indicate the traveling lane, for example. In one implementation, the outside environment recognizer 3 may detect, by means of the image recognition or radar, an object that is provided along and aside of the road on which the vehicle 10 travels, and recognize the shape of the road ahead of the vehicle 10 on the basis of a result of the detection. Non-limiting examples of the object provided along and aside of the road may include a curb, a guardrail, and a side wall.

The outside environment recognizer 3 may also recognize, for example but not limited to, a preceding vehicle and a tollgate that are present ahead of the vehicle 10. The term "tollgate" as used herein refers to a gate-shaped facility directed to collecting a toll for a toll road. It is to be noted that the term "tollgate" as used herein encompasses a tollgate of an electronic toll collection system (ETC) that allows for payment such as advance payment and deferred payment of the toll without stopping a vehicle.

The traveling information detector 4 may recognize a traveling state of the vehicle 10 on the basis of a result of detection performed by a sensor with which the vehicle 10 is provided. Non-limiting examples of the sensor may include a traveling speed sensor, a steering angle sensor, an accelerometer, and an angular accelerometer.

The positioning device 5 may detect a current position of the vehicle 10 by means of one or more of a global positioning system (GPS), an inertial navigation system (INS), and vehicle-to-vehicle communication. The current position of the vehicle 10 may include factors such as latitude and longitude of the vehicle 10.

The map information output device 6 may include a storage storing map information, and output the map information. The map information may include, for example but not limited to, information on a shape of a road such as a curvature of a road, a gradient of a longitudinal section of a road, a state at an intersection of a road and another road. The map information may also include position information of a tollgate.

The notification device 7 may include, for example but not limited to, any of a display device displaying contents such as an image and characters, a light-emitting device emitting light, a speaker generating a sound, a vibrator generating vibration, or any combination thereof. The notification device 7 may allow for an output, by the automatic driving control apparatus 1, of information to the user, such as the driver, of the vehicle 10.

The traveling controller 8 may perform a control that varies the output of the power generator of the vehicle 10, a control that varies the braking force of the brake device, and any other control. The traveling controller 8 may include, for example but not limited to, a vehicle speed controller 8a and a steering controller 8b. The vehicle speed controller 8a may control a traveling speed of the vehicle 10. The steering controller 8b may control a steering angle of the vehicle 10.

The automatic driving control apparatus 1 having the example configuration described above may control, upon execution of the automatic driving of the vehicle 10, each of the traveling speed and the steering angle of the vehicle 10 via the traveling controller 8 on the basis of a result of the recognition by the outside environment recognizer 3 and the traveling information detector 4. It is to be noted that a basic configuration directed to the execution of the automatic driving of the vehicle 10 may be, for example but not limited to, a known configuration which will not be described in detail herein.

Figure 2:
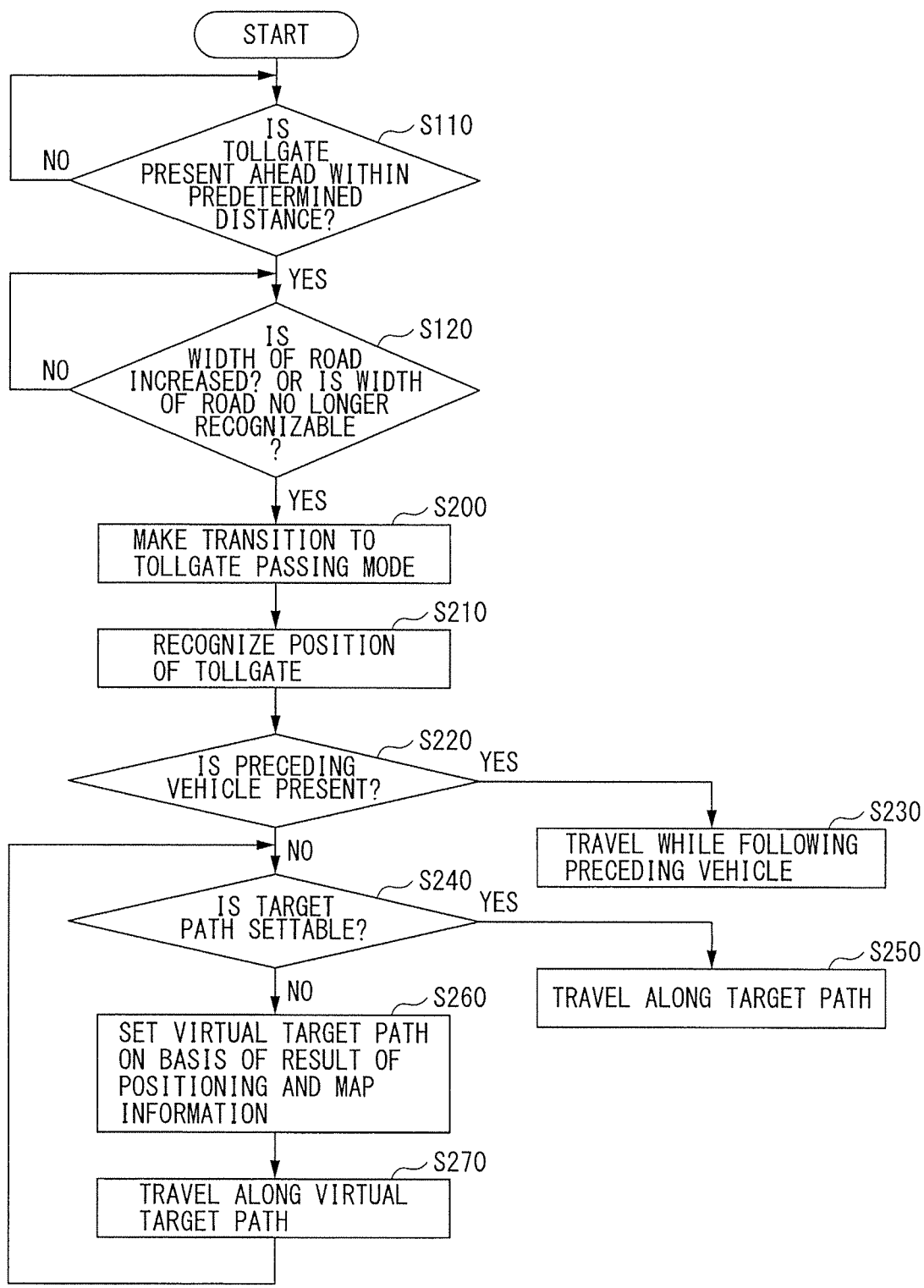
FIG. 2 is a flowchart describing an example of an operation of the automatic driving control apparatus illustrated in FIG. 1.

Referring to a flowchart illustrated in FIG. 2, a description is given next of a control performed by the controller 2 on the automatic driving control apparatus 1 when the vehicle 10 comes close to the tollgate. In the following description, the term "regular traveling mode" refers to an operation mode in which the automatic driving control apparatus 1 causes the vehicle 10 to travel along a path that is automatically or manually set in advance.

In the regular traveling mode, the automatic driving control apparatus 1 may set a target path along a shape of a road recognized by the outside environment recognizer 3, and so control each of the traveling speed and the steering angle of the vehicle 10 that the vehicle 10 travels along the set target path. In one implementation, the foregoing target path that is set along the shape of the road recognized by the outside environment recognizer 3 in the regular traveling mode may serve as a "second target path".

The processes described by the flowchart illustrated in FIG. 2 may be executed when the automatic driving of the vehicle 10 is executed in the regular traveling mode by the automatic driving control apparatus 1.

Upon the execution of the automatic driving of the vehicle 10 by the automatic driving control apparatus 1 according to the present implementation, first, in step S110, the controller 2 may determine presence or absence of the tollgate ahead of the vehicle 10 on a road on which the vehicle 10 travels within a predetermined distance from the vehicle 10. The controller 2 may determine the presence or the absence of the tollgate on the basis of a result of the positioning by the positioning device 5 and the map information stored in the map information output device 6.

When the absence of the tollgate ahead of the vehicle 10 within the predetermined distance from the vehicle 10 is determined in step S110, i.e., NO is determined in step S110, the controller 2 may continue the regular traveling mode that causes the vehicle 10 to travel along the road on which the vehicle 10 travels.

In contrast, when the presence of the tollgate ahead of the vehicle 10 within the predetermined distance from the vehicle 10 is determined in step S110, i.e., YES is determined in step S110, the process to be performed by the controller 2 may proceed to step S120.

In step S120, the controller 2 determines whether a width, of the road on which the vehicle 10 travels, that is recognized by the outside environment recognizer 3 is increased. The outside environment recognizer 3 may recognize the width of the road by detecting the linear or dashed-line mark provided along the traveling lane on the basis of the image captured by the stereo camera. The foregoing detection of the linear or dashed-line mark may be performed, for example but not limited to, by means of the image recognition. In one implementation, the outside environment recognizer 3 may detect the object such as the curb, the guardrail, and the side wall that is provided along and aside of the road on which the vehicle 10 travels, and recognize the width of the road on the basis of a result of the detection. The foregoing detection of the object may be performed, for example but not limited to, by means of the image recognition by the stereo camera or the radar.

When the increase in the width of road on which the vehicle 10 travels is determined in step S120, i.e., YES is determined in step S120, the process to be performed by the controller 2 may proceed to step S200. In step S200, a transition is made from the regular traveling mode to a tollgate passing mode which will be described later.

Further, in step S120, the controller 2 determines whether the width, of the road on which the vehicle 10 travels, that is to be recognized by the outside environment recognizer 3 is no longer recognizable. When the width of the road on which the vehicle 10 travels is no longer recognizable in step S120, i.e., YES is determined in step S120, the process to be performed by the controller 2 may proceed to step S200. In step S200, the controller 2 makes a transition in the operation mode, directed to causing the vehicle 10, to travel from the regular traveling mode to the tollgate passing mode.

The following description refers to an example case where the tollgate is compatible to the ETC that allows the vehicle 10 to pass through the tollgate without stopping the vehicle 10.

In the tollgate passing mode, the controller 2 may set a target path on the basis of a position, of the tollgate relative to the vehicle 10, that is recognized by the outside environment recognizer 3, and so control each of the traveling speed and the steering angle of the vehicle 10 that the vehicle 10 travels along the set target path. The target path may be a path along which the vehicle 10 is to pass through the tollgate.

Further, in the tollgate passing mode, the controller 2 may so control the traveling of the vehicle 10 that the vehicle 10 passes through the tollgate at a predetermined speed which is referred to herein as a passing speed. In one example case where a speed at which the vehicle 10 travels at a time point at which the transition to the tollgate passing mode is made is higher than the passing speed, the controller 2 may cause the vehicle 10 to decelerate as the vehicle 10 approaches the tollgate, and thereby cause the vehicle 10 to enter the tollgate at the passing speed.

Non-limiting examples of the passing speed at which the vehicle 10 is to pass through the tollgate may include a speed that complies with specifications of the ETC, a speed that complies with that prescribed in local regulations of a place in which the vehicle 10 travels, and a speed calculated by the controller 2 on the basis of a width of an entrance of the tollgate recognized by the outside environment recognizer 3.

When presence of the preceding vehicle traveling ahead of the vehicle 10 has been recognized by the outside environment recognizer 3, the controller 2 may set the passing speed at which the vehicle 10 is to pass through the tollgate, also on the basis of a factor such as a distance from the vehicle 10 to the preceding vehicle and a speed of the vehicle 10 relative to that of the preceding vehicle.

In the tollgate passing mode, the controller 2 may set the target path along which the vehicle 10 is to pass through the tollgate and so control each of the traveling speed and the steering angle of the vehicle 10 that the vehicle 10 travels along the target path, not only on the basis of the result of the recognition of the tollgate by the outside environment recognizer 3. In one implementation, the controller 2 may perform the foregoing setting of the target path and the foregoing control of each of the traveling speed and the steering angle of the vehicle also on the basis of the result of the positioning by the positioning device 5 and the map information stored in the map information output device 6.

A description is given next of details of the operation of the automatic driving control apparatus 1 in the tollgate passing mode. Processes in step S210 and subsequent steps in the flowchart illustrated in FIG. 2 describe a control performed by the controller 2 in the tollgate passing mode.

In the tollgate passing mode, in step S210, the controller 2 may first recognize, with the outside environment recognizer 3, the position, relative to the vehicle 10, of the tollgate that is present ahead of the vehicle 10.

Thereafter, in step S220, the controller 2 may determine whether the preceding vehicle that travels ahead of the vehicle 10 and toward the tollgate is recognized by the outside environment recognizer 3.

When determination is made in step S220 that the preceding vehicle is recognized by the outside environment recognizer 3, i.e., YES is determined in step S220, the flow may proceed to step S230. In step S230, the controller 2 may set, as the target path, a path along which the vehicle 10 is to follow the preceding vehicle, and so control each of the traveling speed and the steering angle of the vehicle 10 that the vehicle 10 passes through the tollgate while following the preceding vehicle. Further, the controller 2 may make a transition in the operation mode directed to traveling of the vehicle 10 from the tollgate passing mode to the regular traveling mode, after the vehicle 10 passes through the tollgate.

In contrast, when determination is made in step S220 that the preceding vehicle is not recognized by the outside environment recognizer 3, i.e., NO is determined in step S220, the flow may proceed to step S240. In step S240, the controller 2 may determine whether the target path is settable that allows the vehicle 10 to pass through the tollgate recognized by the outside environment recognizer 3. In one implementation, the foregoing target path that allows the vehicle 10 to pass through the tollgate recognized by the outside environment recognizer 3 may serve as a "first target path".

When determination is made in step S240 that the target path is settable, i.e., YES is determined in step S240, the flow may proceed to step S250. In step S250, the controller 2 may so control each of the traveling speed and the steering angle of the vehicle 10 that the vehicle 10 travels along the target path that passes through the tollgate. Further, the controller 2 may make a transition in the operation mode directed to traveling of the vehicle 10 from the tollgate passing mode to the regular traveling mode, after the vehicle 10 passes through the tollgate.

In contrast, when determination is made in step S240 that the target path is not settable, i.e., NO is determined in step S240, the flow may proceed to step S260. In step S260, the controller 2 may calculate the position of the tollgate relative to the vehicle 10 on the basis of the result of the positioning by the positioning device 5 and the map information stored in the map information output device 6. Further, in step S260, the controller 2 may set, as a virtual target path, a path along which the vehicle 10 is to pass through the tollgate, on the basis of a result of the calculation. In one implementation, the foregoing virtual target path may serve as a "third target path".

Thereafter, in step S270, the controller 2 may so control each of the traveling speed and the steering angle of the vehicle 10 that the vehicle 10 travels along the virtual target path set in step S260. Thereafter, the flow may return to step S240.

As described above, according to the present implementation, the controller 2 may set the virtual target path on the basis of the map information and the result of the positioning of the vehicle 10 by the positioning device 5, and cause the vehicle 10 to travel toward the tollgate, when the target path along which the vehicle 10 is to pass through the tollgate is unsettable on the basis of the result of the recognition by the outside environment recognizer 3 at a time point at which the transition to the tollgate passing mode is made. Thereafter, at a time point at which the target path along which the vehicle 10 is to pass through the tollgate becomes settable on the basis of the result of the recognition by the outside environment recognizer 3, the controller 2 may cause the vehicle 10 to travel toward the tollgate on the basis of the result of the recognition by the outside environment recognizer 3.

Figure 3:
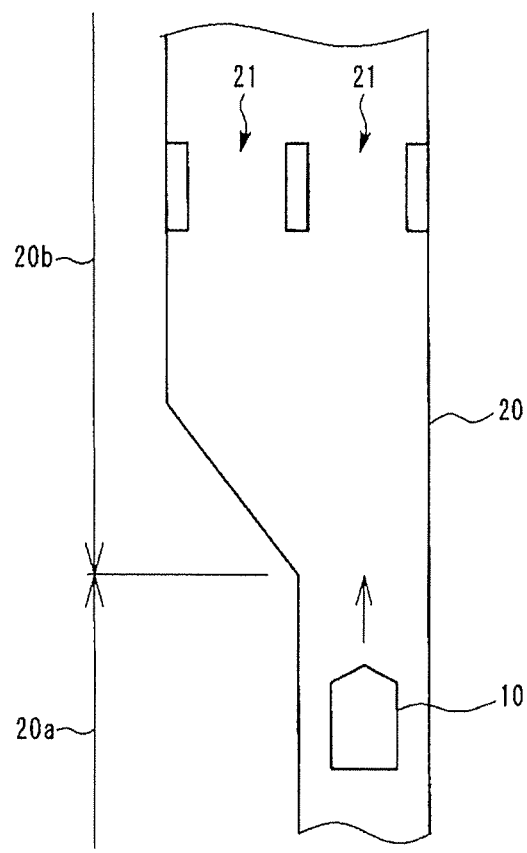
FIG. 3 schematically illustrates an example of a tollgate provided on a road.

FIG. 3 illustrates an example of a road 20 provided with a tollgate 21. In FIG. 3, the road 20 is viewed downward from a point above the road 20, and the vehicle 10 travels in a direction from a lower part toward an upper part on the paper plane of the drawing. Referring to the example illustrated in FIG. 3, a plurality of tollgates 21 are so arranged as to allow a plurality of vehicles to pass through the tollgates 21 in parallel. Accordingly, the tollgates 21 are provided in an increased-width section 20b of the road 20. The increased-width section 20b is a section in which the width of the road 20 is increased compared with that in a regular traveling section 20a.

When the vehicle 10 travels in the regular traveling section 20a of the road 20, the automatic driving control apparatus 1 may operate in the regular traveling mode. Therefore, the controller 2 may so control each of the traveling speed and the steering angle of the vehicle 10 that the vehicle 10 travels along the shape of the road recognized by the outside environment recognizer 3. As described above, the outside environment recognizer 3 may detect the linear or dashed-line mark, and the object such as the curb, the guardrail, and the side wall that are provided along the traveling lane on the road, and recognize the shape of the road on the basis of the result of the detection.

It may be difficult, however, for the controller 2 to set, in the regular traveling mode, the target path along which the vehicle 10 is to travel, when the vehicle 10 approaches the tollgates 21 and enters the increased-width section 20b from the regular traveling section 20a. One possible reason for this is that the width of the road recognized by the outside environment recognizer 3 is excessively great compared with the width of the vehicle 10 in the increased-width section 20b, leading to difficulty in determining which part of the road having the excessively-great width the vehicle 10 is to be caused to travel. Another possible reason is that the shape of the road becomes unrecognizable by the outside environment recognizer 3 on a condition that the linear mark, the dashed-line mark, or the foregoing object provided on the road is not provided in the increased-width section 20b, a condition that the linear mark, the dashed-line mark, or the foregoing object provided on the road is out of a range recognizable by the outside environment recognizer 3, or any other condition.

The controller 2 in the automatic driving control apparatus 1 according to the present implementation may determine that the vehicle 10 travels in the increased-width section 20b, on any of: a condition that the tollgates 21 are present ahead of the vehicle 10 within the predetermined distance from the vehicle 10, and the increase in width of the road on which the vehicle 10 travels is recognized by the outside environment recognizer 3; and a condition that the tollgates 21 are present ahead of the vehicle 10 within the predetermined distance from the vehicle 10, and the width of the road on which the vehicle 10 travels becomes unrecognizable by the outside environment recognizer 3. Further, when determination is made that the vehicle 10 travels in the increased-width section 20b, the controller 2 may make the transition to the tollgate passing mode that sets the target path of the vehicle 10 on the basis of position information of the tollgates 21. In other words, the tollgate passing mode may be an operation mode that sets the target path of the vehicle 10 without using the information on the shape of the road recognized by the outside environment recognizer 3.

In the tollgate passing mode, the controller 2 may set the target path of the vehicle 10 on the basis of one or both of the information on the positions of the tollgates 21 recognized by the outside environment recognizer 3 and the information on the positions of the tollgates 21 determined on the basis of the map information. Hence, according to the automatic driving control apparatus 1 of the present implementation, it is possible to continuously perform the automatic driving control even in a section, of the road, in which the vehicle 10 passes through any of the tollgates 21. In one implementation, the information on the positions of the tollgates 21 recognized by the outside environment recognizer 3 may serve as "first position information". In one implementation, the information on the positions of the tollgates 21 determined on the basis of the map information may serve as "second position information".

Note that it is desired that automatic driving is continuously performed also in a section, of a road, in which a vehicle passes through a tollgate, in a case where the vehicle travels on a toll road by automatic driving by means of an automatic driving control apparatus. In a section, of the road, provided with the tollgate, however, a linear or dashed-line mark indicating a traveling lane on the road may not be provided in some cases. Therefore, it may be difficult for a typical existing automatic driving control apparatus according to a comparative example to recognize a shape of the road, and accordingly, to perform the automatic driving.

Figure 4:
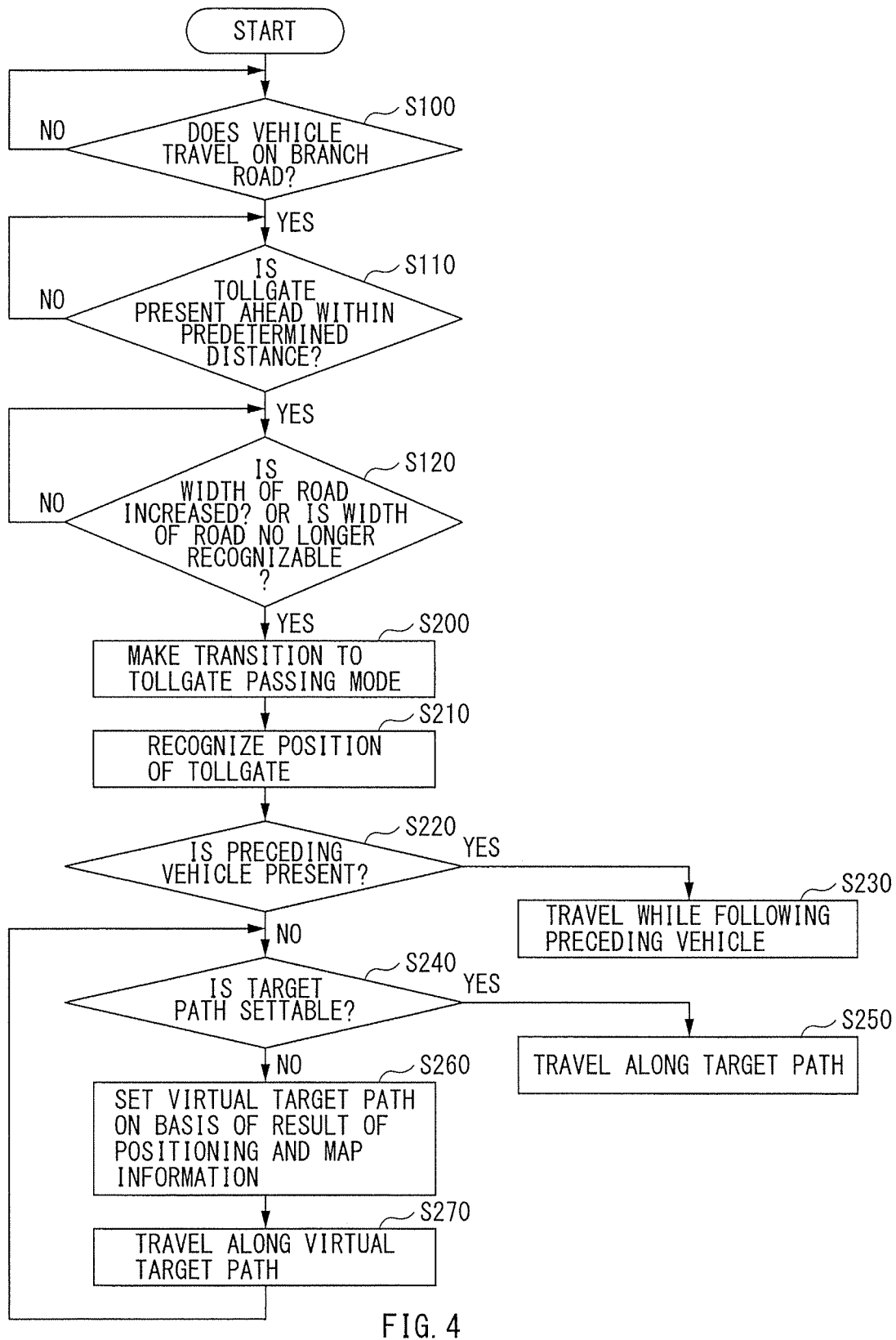
FIG. 4 is a flowchart describing an example of an operation of the automatic driving control apparatus according to a modification example.

FIG. 4 illustrates a flowchart describing an operation of the automatic driving control apparatus 1 according to a modification example of the present implementation.

The flowchart illustrated in FIG. 4 is different from the flowchart illustrated in FIG. 2 in that step S100 is inserted before step S110.

In step S100, the controller 2 may determine whether the vehicle 10 travels on a branch road branched from a main road of a toll road. Non-limiting examples of the branch road may include an entering road that allows for entry to the main road of the toll road, a road coupled to the entering road, an exiting road that allows for exiting from the main road of the toll road, and a road coupled to the exiting road. The road coupled to the entering road refers to a road within a predetermined distance to an entrance of the entering road. The road coupled to the exiting road refers to a road within a predetermined distance from an exit of the exiting road.

The flow may proceed to step S110 only when the controller 2 determines, in step S110, that the vehicle 10 travels on the branch road branched from the main road of the toll road. In other words, the automatic driving control apparatus 1 according to the present modification example may not make a transition to the tollgate passing mode in a case where the vehicle 10 travels on the main road of the toll road, a case where the vehicle 10 travels on a road that is located farther from the entrance or the exit of the toll road than the predetermined distance, or any other case where the vehicle 10 travels in a section in which the possibility that the tollgate is provided is low.

The possibility that the toll gate is provided on a road excluding the branch road is low. Therefore, the automatic driving control apparatus 1 according to the present modification example may halt the processes in step S110 and subsequent steps when the vehicle 10 travels in a section in which the possibility that the tollgate is provided is low, thereby reducing a load on the controller 2. Hence, it is possible to suppress power consumption.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

In one implementation described above, the controller 2 illustrated in FIG. 1 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 2. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

The invention claimed is:

1. An automatic driving control apparatus comprising:
an outside environment recognizer configured to recognize an outside environment of a vehicle;
a traveling information detector configured to detect traveling information of the vehicle;
a positioning device configured to perform positioning of the vehicle;
a map information output device configured to store map information including information on a road shape; and
a controller configured to execute an automatic driving control of the vehicle on a basis of one or more of a result of the recognition of the outside environment, the traveling information, a result of the positioning, and the map information, wherein
upon the execution of the automatic driving control, the controller determines, on a basis of the result of the positioning and the map information, presence or absence of a tollgate within a predetermined distance, from the vehicle, on a road on which the vehicle travels,
the controller makes a transition in an operation mode of the vehicle from a regular traveling mode to a tollgate passing mode, on one of a condition that the presence of the tollgate is determined within the predetermined distance from the vehicle and an increase in width of the road is recognized on a basis of the result of the recognition of the outside environment, and a condition that the presence of the tollgate is determined within the predetermined distance from the vehicle and the width of the road becomes unrecognizable on the basis of the result of the recognition of the outside environment, and
when the operation mode of the vehicle is set to the tollgate passing mode, the controller sets a first target path on a basis of one or both of first position information of the tollgate and second position information of the tollgate, and controls each of a traveling speed of the vehicle and a steering angle of the vehicle to thereby cause the vehicle to travel along the first target path, the first target path being a target path along which the vehicle is to pass through the tollgate, the first position information being recognized on the basis of the result of the recognition of the outside environment, the second position information being determined on a basis of the map information.

2. The automatic driving control apparatus according to claim 1, wherein
in a period of time excluding, within a period of time during which the automatic driving control is executed, a period of time during which the operation mode of the vehicle is set to the tollgate passing mode,
the controller recognizes, on the basis of the result of the recognition of the outside environment, one or more of a linear mark, a dashed-line mark, a curb, a guardrail, and a side wall that are provided along the road, and sets a second target path, the second target path being a target path along which the vehicle is to travel upon traveling along the road, and
the controller controls each of the traveling speed of the vehicle and the steering angle of the vehicle to thereby cause the vehicle to travel along the second target path.

3. The automatic driving control apparatus according to claim 1, wherein,
on a condition that the operation mode of the vehicle is set to the tollgate passing mode, and the tollgate is unrecognizable on the basis of the result of the recognition of the outside environment,
the controller sets a third target path on a basis of the second position information of the tollgate, and controls each of the traveling speed of the vehicle and the steering angle of the vehicle to thereby cause the vehicle to travel along the third target path, the third target path being a virtual target path, and
on a condition that the tollgate is recognized on the result of the recognition of the outside environment after the controller has set the third target path and has controlled each of the traveling speed of the vehicle and the steering angle of the vehicle to thereby cause the vehicle to travel along the third target path, the controller sets the first target path on the basis of the first position information of the recognized tollgate.

4. The automatic driving control apparatus according to claim 2, wherein,
on a condition that the operation mode of the vehicle is set to the tollgate passing mode, and the tollgate is unrecognizable on the basis of the result of the recognition of the outside environment, the controller sets a third target path on a basis of the second position information of the tollgate, and controls each of the traveling speed of the vehicle and the steering angle of the vehicle to thereby cause the vehicle to travel along the third target path, the third target path being a virtual target path, and on a condition that the tollgate is recognized on the result of the recognition of the outside environment after the controller has set the third target path and has controlled each of the traveling speed of the vehicle and the steering angle of the vehicle to thereby cause the vehicle to travel along the third target path, the controller sets the first target path on the basis of the first position information of the recognized tollgate.

5. The automatic driving control apparatus according to claim 1, wherein the controller makes the transition in the operation mode of the vehicle from the regular traveling mode to the tollgate passing mode on a condition that the vehicle travels on a branch road branched from a main road of a toll road.

6. The automatic driving control apparatus according to claim 2, wherein the controller makes the transition in the operation mode of the vehicle from the regular traveling mode to the tollgate passing mode on a condition that the vehicle travels on a branch road branched from a main road of a toll road.

7. The automatic driving control apparatus according to claim 3, wherein the controller makes the transition in the operation mode of the vehicle from the regular traveling mode to the tollgate passing mode on a condition that the vehicle travels on a branch road branched from a main road of a toll road.

8. The automatic driving control apparatus according to claim 4, wherein the controller makes the transition in the operation mode of the vehicle from the regular traveling mode to the tollgate passing mode on a condition that the vehicle travels on a branch road branched from a main road of a toll road.

9. An automatic driving control apparatus comprising:
at least one first sensor configured to recognize an outside environment of a vehicle;
at least one second sensor configured to detect a traveling state of the vehicle;
a positioning device configured to perform positioning of the vehicle;
a map information output device configured to store map information including information on a road shape; and
circuitry configured to execute an automatic driving control of the vehicle on a basis of one or more of a result of the recognition of the outside environment, the traveling information, a result of the positioning, and the map information, wherein
upon the execution of the automatic driving control, the circuitry determines, on a basis of the result of the positioning and the map information, presence or absence of a tollgate within a predetermined distance, from the vehicle, on a road on which the vehicle travels,
the circuitry makes a transition in an operation mode of the vehicle from a regular traveling mode to a tollgate passing mode, on one of a condition that the presence of the tollgate is determined within the predetermined distance from the vehicle and an increase in width of the road is recognized on a basis of the result of the recognition of the outside environment, and a condition that the presence of the tollgate is determined within the predetermined distance from the vehicle and the width of the road becomes unrecognizable on the basis of the result of the recognition of the outside environment, and
when the operation mode of the vehicle is set to the tollgate passing mode, the circuitry sets a first target path on a basis of one or both of first position information of the tollgate and second position information of the tollgate, and controls each of a traveling speed of the vehicle and a steering angle of the vehicle to thereby cause the vehicle to travel along the first target path, the first target path being a target path along which the vehicle is to pass through the tollgate, the first position information being recognized on the basis of the result of the recognition of the outside environment, the second position information being determined on a basis of the map information.

10. An automatic driving control method comprising:
recognizing an outside environment of a vehicle;
detecting traveling information of the vehicle;
performing positioning of the vehicle;
storing map information including information on a road shape; and
executing an automatic driving control of the vehicle on a basis of one or more of a result of the recognition of the outside environment, the traveling information, a result of the positioning, and the map information, wherein
upon the execution of the automatic driving control, presence or absence of a tollgate within a predetermined distance, from the vehicle, on a road on which the vehicle travels is determined on a basis of the result of the positioning and the map information,
a transition in an operation mode of the vehicle from a regular traveling mode to a tollgate passing mode is performed, on one of a condition that the presence of the tollgate is determined within the predetermined distance from the vehicle and an increase in width of the road is recognized on a basis of the result of the recognition of the outside environment, and a condition that the presence of the tollgate is determined within the predetermined distance from the vehicle and the width of the road becomes unrecognizable on the basis of the result of the recognition of the outside environment, and
when the operation mode of the vehicle is set to the tollgate passing mode, a first target path is set on a basis of one or both of first position information of the tollgate and second position information of the tollgate, and each of a traveling speed of the vehicle and a steering angle of the vehicle is controlled to thereby cause the vehicle to travel along the first target path, the first target path being a target path along which the vehicle is to pass through the tollgate, the first position information being recognized on the basis of the result of the recognition of the outside environment, the second position information being determined on a basis of the map information.

* * * * *